United States Patent
Meyer et al.

(10) Patent No.: US 9,963,219 B2
(45) Date of Patent: May 8, 2018

(54) AIRFOIL PORTION WITH A CHAMBER

(71) Applicants: Airbus Defence and Space GmbH, Ottobrunn (DE); Airbus Operations GmbH, Hamburg (DE)

(72) Inventors: Michael Meyer, Munich (DE); Wolfgang Machunze, Höhenkirchen (DE); Matthias Lengers, Hamburg (DE)

(73) Assignees: Airbus Defence and Space GmbH (DE); Airbus Operations GmbH (DE)

( * ) Notice: Subject to any disclaimer, the term of this patent is extended or adjusted under 35 U.S.C. 154(b) by 276 days.

(21) Appl. No.: 14/841,817

(22) Filed: Sep. 1, 2015

(65) Prior Publication Data
US 2016/0068250 A1    Mar. 10, 2016

(30) Foreign Application Priority Data

Sep. 9, 2014 (EP) .................................. 14184074

(51) Int. Cl.
| | |
|---|---|
| *B64C 1/00* | (2006.01) |
| *B64C 3/00* | (2006.01) |
| *B64C 5/00* | (2006.01) |
| *B64C 3/26* | (2006.01) |
| *B64C 3/14* | (2006.01) |
| *B64C 3/18* | (2006.01) |
| *B64C 9/14* | (2006.01) |
| *B64C 21/02* | (2006.01) |

(52) U.S. Cl.
CPC .................. *B64C 3/26* (2013.01); *B64C 3/14* (2013.01); *B64C 3/185* (2013.01); *B64C 9/14* (2013.01); *B64C 21/02* (2013.01); *Y02T 50/166* (2013.01); *Y02T 50/44* (2013.01)

(58) Field of Classification Search
CPC .. B64C 3/26; B64C 3/14; B64C 3/185; B64C 21/02; B64C 21/08; B64C 21/04
See application file for complete search history.

(56) References Cited

U.S. PATENT DOCUMENTS

| | | | |
|---|---|---|---|
| 1,988,670 A | 1/1935 | Stalker | |
| 2,223,744 A | 12/1940 | Stalker | |
| 2,928,627 A * | 3/1960 | Johnson | .................. B64C 21/04 244/15 |
| 2,946,540 A | 7/1960 | Coanda Henri | |
| 5,806,808 A | 9/1998 | O'Neil | |
| 8,434,724 B2 | 5/2013 | Chelin et al. | |

FOREIGN PATENT DOCUMENTS

| | | |
|---|---|---|
| DE | 723 570 C | 8/1942 |
| FR | 2 924 407 A1 | 6/2009 |

OTHER PUBLICATIONS

Extended European Search Report EP 14 18 4074 dated Feb. 23, 2015.

* cited by examiner

*Primary Examiner* — Philip J Bonzell
(74) *Attorney, Agent, or Firm* — Lerner, David, Littenberg, Krumholz & Mentlik, LLP

(57) ABSTRACT

An airfoil portion includes an outer skin member and an inner stiffening member. Either the outer skin member or the inner stiffening member or both are arranged to delimit a chamber. The chamber is configured to contain an inner pressure, wherein the inner pressure differs from a pressure external to the chamber. In an embodiment, an aircraft includes such an airfoil portion. A method for providing such an airfoil portion with a chamber is also described.

13 Claims, 3 Drawing Sheets

AIRFOIL PORTION WITH A CHAMBER

FIELD OF THE INVENTION

The invention relates to an airfoil portion with a chamber or plenum, an aircraft comprising such airfoil portion, and a method for providing such airfoil portion with such chamber or plenum.

BACKGROUND OF THE INVENTION

A chamber or plenum can be a pressurized housing containing a gas or fluid (typically air) at a pressure different from the surroundings. Such plenums can be arranged at an airfoil portion of an aircraft to improve the airfoil's flight properties, as e.g. to impose homogeneity in air flows. Conventionally, such plenums are made from parts separate the airfoil portion, as e.g. tubes, pipes, etc. Such additional parts, however, increase the weight, the costs and the manufacture effort for an airfoil portion with a plenum.

BRIEF SUMMARY OF THE INVENTION

Hence, there may be a need to provide a lighter airfoil portion with a chamber.

It should be noted that the aspects of the invention described in the following apply also to the airfoil portion, the aircraft comprising such airfoil portion, and the method for providing such airfoil portion with a chamber.

According to an embodiment of the present invention, an airfoil portion is presented. The airfoil portion comprises an outer skin member and an inner stiffening member. Either the outer skin member or the inner stiffening member or both are arranged to delimit a chamber. The chamber is configured to contain an inner pressure, wherein the inner pressure differs from a pressure external to the chamber.

As a result, the chamber is provided in the airfoil portion without the need for additional separate parts. The chamber is formed only by parts of the airfoil portion, as the outer skin member and/or the inner stiffening member. In other words, there is a double use of parts of the airfoil portion as first, the outer skin member and/or the inner stiffening member, and second, as components forming the chamber. Thereby, the outer skin member and/or the inner stiffening member as system parts are also used as structural parts. This double use allows reducing weight, costs and manufacturing effort for such airfoil portion with a chamber.

The inner pressure may be an overpressure or underpressure of gas or fluid (typically air) relative to the pressure external to the chamber. The overpressure may allow e.g. a greater stability to aerodynamic loads, a better protection to bird strike and so on.

The inner stiffening member may be at least one spar, rib and sandwich or the like or combinations thereof. In an example, the inner stiffening member is a front spar configured to provide a structural stability to the airfoil portion. In another example, the inner stiffening member is a mounting spar configured to hold a mechanical and/or electric subsystem of the aircraft. In a further example, the inner stiffening member is a combination spar configured to provide a structural stability to the airfoil portion and to hold a mechanical and/or electric subsystem of the aircraft. This multiple use of the combination spar allows further reducing weight, costs and manufacturing effort.

In an example, the chamber extends between the inner stiffening member, a leading edge, a portion of an upper surface, and a portion of a lower surface of the airfoil portion. The usage of this space between the inner stiffening member and the leading edge as chamber and e.g. overpressure plenum is beneficial in terms of structural stability. If the chamber is formed by the leading edge, the chamber provides an improved separation control. In another example, the chamber extends between the inner stiffening member, a trailing edge, a portion of an upper surface, and a portion of a lower surface of the airfoil portion. In a further example, the chamber extends between the front spar as inner stiffening member, a rear spar, a portion of an upper surface, and a portion of a lower surface of the airfoil portion. From an aerodynamic point of view, the chamber is preferably as large as possible to ensure a low-friction flow.

The chamber may be a plenum. The plenum may comprise a volume in the airfoil extending between the outer skin member and the inner stiffening member. The maximum plenum volume may be optimal for any application reasoned by minimizing dynamic pressure associated with pressure losses. The term "optimal" has to be understood as follows: the larger the plenum's cross-section, the smaller the flow velocity, the smaller the friction losses depending on the dynamic pressure, the smaller the pressure losses, the better the pressure's homogeneity in the direction of the plenum, which means that the maximum plenum volume is optimal.

The inner pressure in the plenum relative to the plenum exterior has a slight over or underpressure to ensure effectiveness with respect to the desired application (suction and blowing). The exact value of the inner pressure may depend on the intended application of the airfoil portion and in particular on its profile, flight phase, position at the aircraft and the like. The exact value of the inner pressure may depend on the structural integrity.

In an example, the airfoil portion further comprises at least one aperture configured for a passing of air in or out the chamber. The aperture may be of any type, as e.g. slots and holes in the upper surface or the lower surface of the airfoil portion. The aperture may be located at any position of the airfoil. The aperture may be configured for a passing of air into in terms of suction or out of the chamber in terms of blowing.

In an example, the airfoil portion further comprises a flow control system and in particular an active flow control system configured to provide an air flow relative to a surface of the airfoil portion. The air flow relative to the surface of the airfoil portion may be along the surface, orthogonal, tangential or combinations thereof.

Such flow control system may comprise at least a fluid actuator and may be utilized, e.g., in order to prevent flows from separating or detaching from the airfoil portion or from another flow body, or to reattach a flow that has already detached or separated from the airfoil portion or other flow body. The flow control system may be also configured to provide boundary layer suction to inhale the detaching or detached boundary layer or to prevent laminar turbulent transition.

At least parts of the flow control system may be mounted to the inner stiffening member. Thereby, structural stability and protection against e.g. bird strike is provided.

These parts of the flow control system can also be used as load carrying structure. This double use of the flow control system to provide flow control and to provide structural stability allows further reducing weight, costs and manufacturing effort.

Air for the chamber and/or for the flow control system may be provided by an aircraft's engine or by an air intake at the airfoil portion.

The airfoil may be a flap, a wing, a winglet, a tail plane, a slat, a tap, a control surface, a mounting surface, and/or a fuselage portion. If the chamber is formed by the leading edge of a wing portion as airfoil portion, the chamber provides an improved hybrid laminar flow control.

According to an embodiment of the present invention, also an aircraft is presented. The aircraft comprises an airfoil portion as described above. The airfoil portion comprises again an outer skin member and an inner stiffening member. The outer skin member and/or the inner stiffening member are arranged to delimit a chamber. The chamber is configured to contain an inner pressure, wherein the inner pressure differs from a pressure external to the chamber.

According to an aspect of the present invention, also a method for providing an airfoil portion with a chamber is presented. It comprises the following steps, not necessarily in this order:
a) providing an inner stiffening member,
b) providing an outer skin member, and
c) arranging the inner stiffening member and/or the outer skin member to delimit a chamber.

The chamber is configured to contain an inner pressure, and the inner pressure differs from a pressure external to the chamber. As a result, the chamber is provided in the airfoil portion without the need for additional separate parts. In other words, there is a double use of parts of the airfoil portion as first, the outer skin member and/or the inner stiffening member, and second, as components forming the chamber.

It shall be understood the airfoil portion, the aircraft comprising such airfoil portion, and the method for providing such airfoil portion with a chamber according to the independent claims have similar and/or identical preferred embodiments, in particular, as defined in the dependent claims. It shall be understood further that a preferred embodiment of the invention can also be any combination of the dependent claims with the respective independent claim.

These and other aspects of the present invention will become apparent from and be elucidated with reference to the embodiments described hereinafter.

BRIEF DESCRIPTION OF THE DRAWINGS

Exemplary embodiments of the invention will be described in the following with reference to the accompanying drawings.

DETAILED DESCRIPTION

Figure 1:
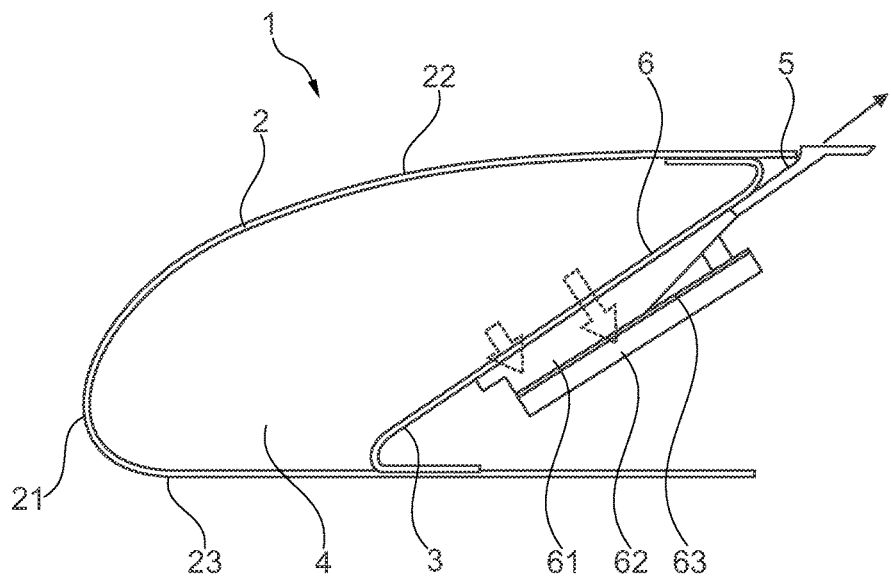
FIG. 1 shows schematically and exemplarily an embodiment of an airfoil portion according to the invention.

FIG. 1 shows schematically and exemplarily an embodiment of an airfoil portion 1 according to the invention. The airfoil is here a flap. The airfoil portion 1 comprises an outer skin member 2 and an inner stiffening member 3. Here, the outer skin member 2 and the inner stiffening member 3 are arranged to delimit a chamber 4. The chamber 4 is configured to contain an inner pressure, wherein the inner pressure differs from a pressure external to the chamber 4. In this example, the chamber 4 is configured to contain an overpressure relative to the surroundings.

Here, the inner pressure is e.g. an about 0.5 bar overpressure relative to the pressure external to the chamber 4. The chamber 4 is a plenum. It extends between a nose of a leading edge 21, a portion of an upper surface 22, and a portion of a lower surface 23 of the outer skin member 2 and the inner stiffening member 3. The chamber 4 comprises an aperture 5 for a passing of air in or out the chamber 4 as shown by the arrow. The aperture 5 is here an outlet jet sleeve in the upper surface 22 of the airfoil portion 1. The aperture 5 can, however, also be any other kind of opening and can also be arranged elsewhere in the chamber 4.

The inner stiffening member 3 is here at least a Z-shaped spar and in particular a combination spar of a front spar providing a structural stability to the airfoil portion 1 and a mounting spar holding a flow control system.

The airfoil portion 1 further comprises an active flow control system 6 to provide an air flow along the surface of the airfoil portion 1. The flow control system comprises a so-called two stage fluidic actuator system with an actuator stage 61 and a control stage 62 for influencing an air flow relative to the surface. The actuator stage 61 and the control stage 62 are here separated by a cover panel 63. The actuator stage 61 is mounted to the inner stiffening member 3. The cover panel 63 and the control stage 62 are mounted to the actuator stage 61. These parts of the flow control system form a load carrying structure.

Figure 1A:
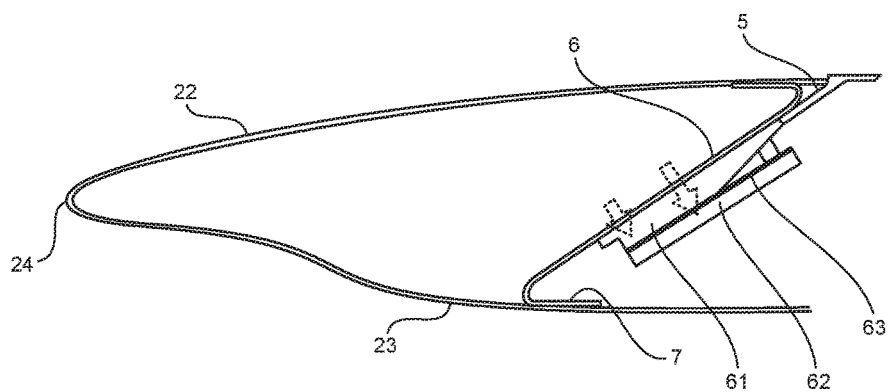
FIG. 1A shows schematically and exemplarily an embodiment of an airfoil portion according to the invention.
Figure 1B:
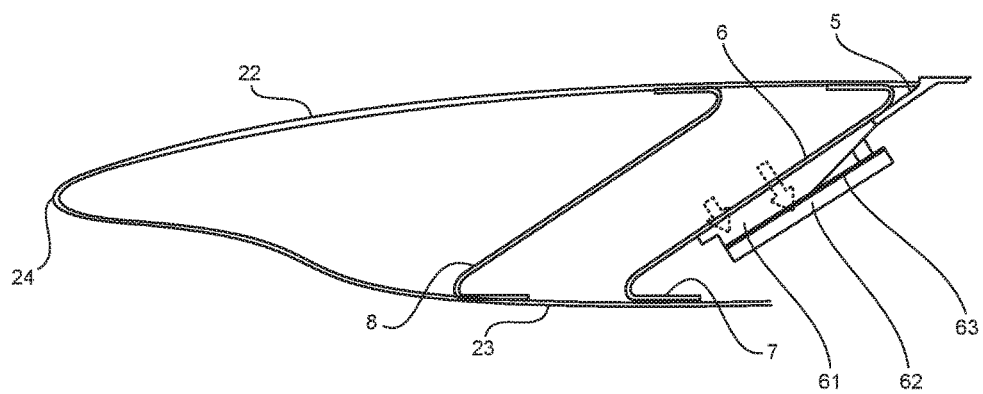
FIG. 1B shows schematically and exemplarily an embodiment of an airfoil portion according to the invention.

FIG. 1A illustrates the chamber 4 extending between the inner stiffening member 3, a trailing edge 24, a portion of the upper surface 22 and a portion of the lower surface 23. FIG. 1B illustrates the chamber 4 extending between the front spar 3 as the inner stiffening member, a rear spar 7, a portion of the upper surface 22 and a portion of the lower surface 23.

Figure 2:
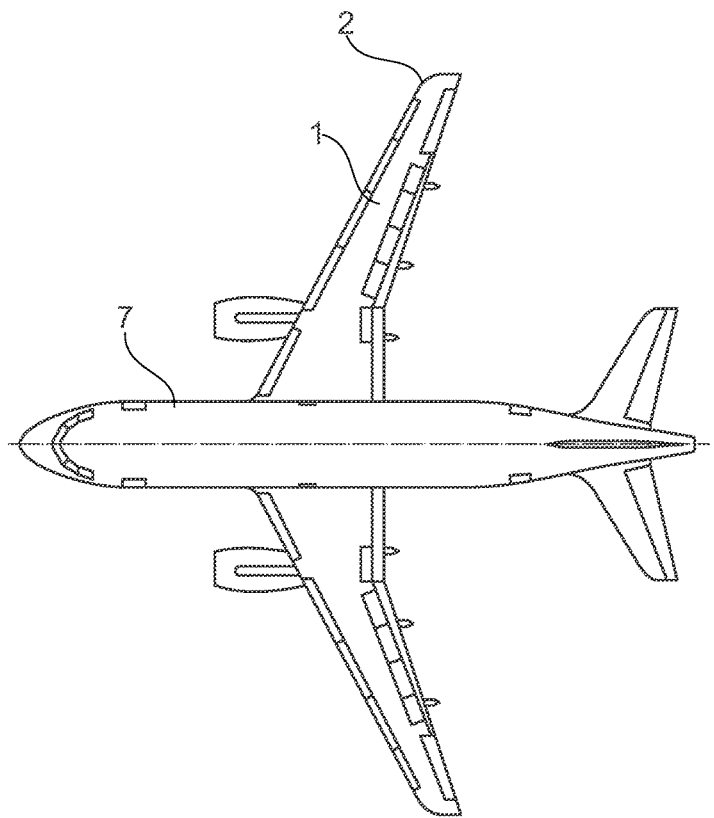
FIG. 2 shows schematically and exemplarily an embodiment of an aircraft 7 according to the invention.

FIG. 2 shows schematically and exemplarily an embodiment of an aircraft 7 according to the invention. The aircraft 7 comprises an airfoil portion 1 as described above. The airfoil is here a wing. The airfoil portion 1 comprises again an outer skin member 2 and an inner stiffening member 3 (not shown). Here, the outer skin member 2 and the inner stiffening member 3 are arranged to delimit a chamber 4 (not shown). The chamber 4 is configured to contain an inner pressure, wherein the inner pressure differs from a pressure external to the chamber 4.

Figure 3:
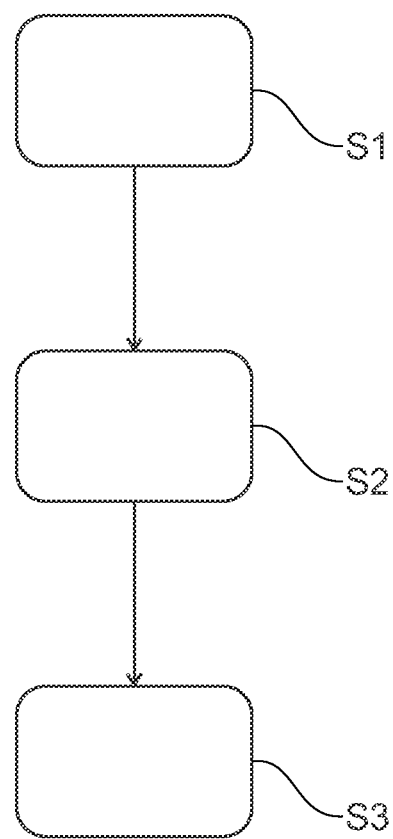
FIG. 3 shows schematically and exemplarily an embodiment of a method for providing an airfoil portion with a chamber according to the invention.

FIG. 3 shows schematically and exemplarily an embodiment of a method for providing an airfoil portion 1 with a chamber 4 according to the invention. It comprises the following steps, not necessarily in this order:

In step S1, providing an inner stiffening member 3,
In step S2, providing an outer skin member 2, and
In step S3, arranging the inner stiffening member 3 and/or the outer skin member 2 to delimit a chamber 4.

The chamber 4 is configured to contain an inner pressure, and the inner pressure differs from a pressure external to the chamber 4. As a result, the chamber 4 is provided in the airfoil portion 1 without the need for additional separate parts. Thereby, the outer skin member 2 and/or the inner stiffening member 3 as system parts are also used as structural parts. This double use allows reducing weight, costs and manufacturing effort for such airfoil portion 1 with a chamber 4.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An airfoil portion, comprising:
an outer skin member;
an inner stiffening member, and
a flow control system configured to provide an air flow relative to a surface of the airfoil portion, the flow control system comprising at least one fluidic actuator with an actuator stage and a control stage separated by a cover panel for influencing the air flow relative to the surface,
wherein at least one of the outer skin member and the inner stiffening member is arranged to at least partially delimit a chamber,
wherein the chamber is configured to contain an inner pressure,
wherein the inner pressure differs from a pressure external to the chamber,
wherein the actuator stage is mounted to the inner stiffening member,
wherein the cover panel and the control stage are mounted to the actuator stage, and
wherein the actuator stage, the cover panel and the control stage form a load carrying structure.

2. The airfoil portion according to claim 1, wherein the chamber is a plenum and wherein the inner pressure is an overpressure or underpressure relative to the pressure external to the chamber.

3. The airfoil portion according to claim 1, wherein the inner stiffening member is a front spar configured to provide a structural stability to the airfoil portion.

4. The airfoil portion according to claim 1, wherein the inner stiffening member is a mounting spar configured to hold a mechanical and/or electric subsystem of the aircraft.

5. The airfoil portion according to claim 1, wherein the inner stiffening member is a combination spar configured to provide a structural stability to the airfoil portion and to hold at least one of a mechanical and an electric subsystem of the aircraft.

6. The airfoil portion according to claim 1, wherein the chamber extends between the inner stiffening member, a leading edge, a portion of an upper surface, and a portion of a lower surface of the airfoil portion.

7. The airfoil portion according to claim 1, wherein the chamber extends between the inner stiffening member, a trailing edge, a portion of an upper surface, and a portion of a lower surface of the airfoil portion.

8. The airfoil portion according to claim 1, wherein the chamber extends between a front spar as the inner stiffening member, a rear spar, a portion of an upper surface, and a portion of a lower surface of the airfoil portion.

9. The airfoil portion according to claim 1, further comprising at least one aperture configured for a passing of air in or out the chamber.

10. The airfoil portion according to claim 1, wherein air for at least one of the chamber and the flow control system is provided by an air intake at the airfoil portion.

11. The airfoil portion according to claim 1, wherein the airfoil portion is a portion of a flap, a wing, a winglet, a tail plane, a slat, a tap, a control surface, a mounting surface, and/or a fuselage portion.

12. An aircraft comprising an airfoil portion comprising:
an outer skin member;
an inner stiffening member, and
a flow control system configured to provide an air flow relative to a surface of the airfoil portion, the flow control system comprising at least one fluidic actuator with an actuator stage and a control stage separated by a cover panel for influencing the air flow relative to the surface,
wherein at least one of the outer skin member and the inner stiffening member is arranged to at least partially delimit a chamber,
wherein the chamber is configured to contain an inner pressure,
wherein the inner pressure differs from a pressure external to the chamber,
wherein the actuator stage is mounted to the inner stiffening member,
wherein the cover panel and the control stage are mounted to the actuator stage, and
wherein the actuator stage, the cover panel and the control stage form a load carrying structure.

13. A method for providing an airfoil portion with a chamber, comprising:
providing an inner stiffening member;
providing an outer skin member;
providing a flow control system configured to provide an air flow relative to a surface of the airfoil portion, the flow control system comprising at least one fluidic actuator with an actuator stage and a control stage separated by a cover panel for influencing the air flow relative to the surface;
arranging at least one of the inner stiffening member and the outer skin member to at least partially delimit a chamber;
mounting the actuator stage to the inner stiffening member;
mounting the cover panel and the control stage to the actuator stage,
wherein the actuator stage, the cover panel and the control stage form a load carrying structure,
wherein the chamber is configured to contain an inner pressure, and wherein the inner pressure differs from a pressure external to the chamber.

* * * * *